United States Patent
Fujisawa et al.

[15] 3,697,601
[45] Oct. 10, 1972

[54] PROCESS FOR PREPARING 4-ARYLTHIO-2,6-DIALKYLPHENOLS

[72] Inventors: Tamotsu Fujisawa; Takakazu Kojima, both of Sagamihara, Japan

[73] Assignee: Sagami Chemical Research Center, Tokyo, Japan

[22] Filed: Oct. 30, 1970

[21] Appl. No.: 85,724

[30] Foreign Application Priority Data

Nov. 12, 1969  Japan ....................44/90074

[52] U.S. Cl. ...............................260/609 F, 260/608
[51] Int. Cl............................................C07c 149/36
[58] Field of Search ..........................260/609 F, 608

[56] References Cited

OTHER PUBLICATIONS

Muller et al., Ann., 645, 79– 85 (1961)

Primary Examiner—Lewis Gotts
Assistant Examiner—D. R. Phillips
Attorney—Flynn & Frishauf

[57] ABSTRACT

A new process for the production of 4-arylthio-2,6-dialkylphenols is described. 2,6-Dialkylphenol reacts with an aromatic disulfide in the presence of an alkali hydroxide or alkali metal in a solvent under heating. The process yields 4-arylthio-2,6-dialkylphenols, which are useful economically as an antioxidant in a high yield.

5 Claims, No Drawings

PROCESS FOR PREPARING 4-ARYLTHIO-2,6-DIALKYLPHENOLS

BACKGROUND OF THE INVENTION

The present invention relates to a process for preparing 4-arylthio-2,6-dialkylphenols having the general formula

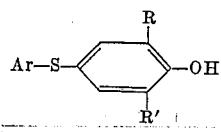

wherein R and R' are respectively aliphatic hydrocarbon radicals, and Ar is an aromatic radical. The compound heretofore known as included in the present compound is only 4-phenylthio-2,6-di-t-butylphenol. This well-known compound, 4-phenylthio-2,6-di-t-butylphenol is obtained by reacting 4,4'-dithiobis-2,6-di-t-butylphenol with phenyl lithium or phenyl magnesium bromide (E. Muller et. al. Ann., 645, 79 (1961)). However, this prior process is not satisfactory from an industrial or commercial viewpoint, because the starting material is unstable to moisture.

SUMMARY OF THE INVENTION

It is an object of this invention to provide a new process for preparing 4-arylthio-2,6-dialkylphenols. An extensive study was conducted by us with a view to finding a process whereby the desired 2,6-dialkylphenol reacts with an aromatic disulfide in the presence of an alkali hydroxide or an alkali metal in a solvent under heating to produce 4-arylthio-2,6-dialkylphenol. This invention will be made clear from the following description.

2,6-Dialkylphenols suitable for use as one of the starting materials according to the present invention included hindered phenols containing alkyl radicals in the positions ortho to the hydroxyl radical, i.e. 2- and 6-positions. 2,6-Di-t-butylphenol is preferred. And also, aromatic disulfides suitable for use the other starting materials according to the present invention include aromatic disulfides having substituents which do not interfere with the reaction in the present invention.

It is important that the process of the present invention be carried out in a basic condition, and the preferred way of maintaining the basic condition is by the presence of alkali hydroxide or alkali metal such as metalic sodium, potassium etc. These basic materials may be used in the amounts of equivalent mole or more to hindered phenols.

Any solvent which does not react with the basic materials and the final product may be used in the present process. Alcohol such as methanol, ethanol, propanol, glycol and aprotic solvent such as pyridine, dimethyl formamide, dimethyl acetoamide are preferable as the solvent to be used in the present invention. Also, a mixture of these solvents and water in any proportions may be used in the present invention.

In carrying the present invention into practice, an alkali hydroxide or an alkali metal is added to a mixture of hindered phenol and aromatic disulfide in a solvent of the type mentioned, and the mixture is heated under reflux in a nitrogen atmosphere. The heating is generally continued for about 0.5 to 50 hours. The reaction time should vary with different reaction temperatures. After the reaction is complete, the reaction mixture is neutralized with hydrochloric acid, and the product may be recovered from the reaction mixture in a conventional manner.

The reaction mechanism in the process of the present invention is as follows:

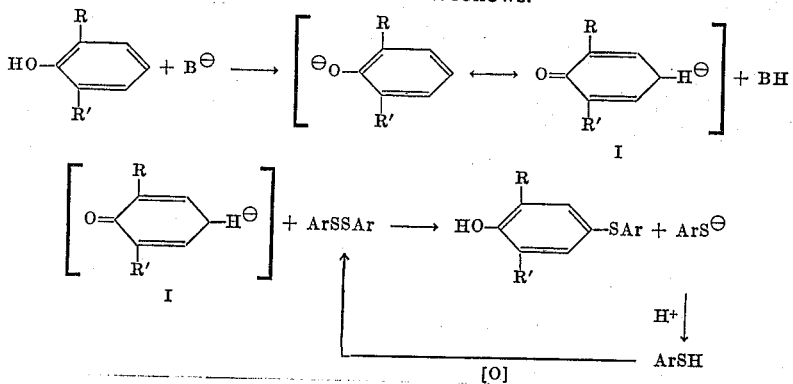

As seen from the above reaction formula, 4-arylthio-2,6-dialkylphenol is formed by an attack of carbanion (I) produced with a base ($B^\ominus$) and 2,6-dialkylphenol to sulfur atoms of disulfide.

Simultaneously, the formed thiophenol is easily oxidized under the basic condition, and thereby forms disulfide. Since this reformed disulfide acts as a reactant, the yield calculated based on the charging amount of disulfide may become above 100 percent. 4-Arylthio-2,6-dialkylphenols are useful as antioxidants.

DESCRIPTION OF PREFERRED EMBODIMENTS

The following examples are not limitative but merely illustrate the present invention. In the examples, all parts are by weight unless otherwise specified.

EXAMPLE 1

In 200 parts of 95 percent ethanol solution containing potassium hydroxide in 1 N concentration was dissolved 14 parts of bis(4-methoxyphenyl) disulfide, followed by the addition of 21 parts of 2,6-di-butylphenol, and the mixture was refluxed under heating for 20 hours while introducing nitrogen gas. The reaction mixture was neutralized with hydrochloric acid and organic materials were extracted with benzene. The benzene was removed by distillation. By letting the residue stand, 4-(p-methoxyphenyl-thio)2,6-di-t-butylphenol was crystallized. These crystals were recrystallized from ethanol. m. p. 141.5 – 142.0. Yield: 10.5 parts (Yield 61 percent).

EXAMPLE 2

The procedure of Example 1 was repeated except that a different aromatic disulfide was used for bis(4-methoxyphenyl) disulfide. By the procedure, the desired 4-arylthio-2,6-di-t-butylphenol was obtained.

The results are summarized in Table 1.

TABLE 1

| Disulfide | Charging amount (parts) | Yield (%) | Melting point (°C) |
| --- | --- | --- | --- |
| Diphenyl disulfide | 11 | 36 | 102–3 |
| di(p-tolyl)disulfide | 12.5 | 44 | 96–97 |
| Bis)(p-chlorophenyl) disulfide | 14.5 | 59 | 89–90 |
| Bis(p-bromophenyl) disulfide | 19 | 36 | 100–101 |
| 4,4'-dithiobis(2,6-di-t-butylphenol) | 24 | 84 | 138–9 |

EXAMPLE 3

Aromatic disulfide and 21 parts of 2,6-di-t-butylphenol were added to 185 parts of absolute ethanol containing 5 parts of metallic sodium, and the resulting mixture was refluxed under heating for 20 hours while introducing nitrogen gas. The mixture was treated in a manner similar to Example 1 to obtain 4-arylthio-2,6-di-t-butylphenol. The results are summarized in Table 2.

TABLE 2

| Disulfide | Charging amount (parts) | Yield (parts) | Yield (%) |
| --- | --- | --- | --- |
| Diphenyl disulfide | 11 | 19.4 | 123 |
| Di(p-tolyl)disulfide | 12.5 | 18.3 | 111 |
| Bis(4-chlorophenyl) disulfide | 14.5 | 15.4 | 88 |
| Bis(4-bromophenyl) disulfide | 19 | 19.3 | 98 |
| Bis(4-methoxyphenyl) disulfide | 14 | 15.1 | 88 |
| 4,4'-dithiobis(2,6-di-t-butylphenol) | 24 | 17.7 | 80 |

EXAMPLE 4

In 250 parts of pyridine was dissolved 24 parts of 4,4'-dithiobis(2,6-di-t-butylphenol) and 21 parts of 2,6-di-t-butylphenol, followed by the addition of 1 part of sodium ethoxide. The mixture was heated to 85° C. and was allowed to react for 15 hours. After the reaction was complete, the pyridine solvent was distilled off under reduced pressure, followed by neutralization with hydrochloric acid. The resulting product was treated in a manner similar to that of Example 1 to obtain 17 parts of 4,4'-thiobis(2,6-di-t-butylphenol). Yield: 77 percent.

EXAMPLE 5

In 200 parts of 95 percent ethanol solution containing 5 parts of sodium was dissolved 14 parts of bis(4-methoxyphenyl) disulfide and 16.5 parts of 2-t-butyl-6-methylphenol, and the resulting mixture was refluxed under heating while introducing nitrogen gas for 20 hours. The resulting product was treated in a manner similar to that in Example 1 to obtain 2.6 parts of 4-(p-methoxyphenyl-thio)2-t-butyl-6-methylphenol. Yield: 28 percent; m. p. 104°–5° C.

EXAMPLE 6

Example 1 was repeated except that the reaction time was 1 hour, and 10 parts of 4-(p-methoxyphenyl)thio-2,6-di-t-butylphenol, was obtained. Yield: 58 percent.

EXAMPLE 7

Example 3 was repeated except that di-p-tolyldisulfide was used as aromatic disulfide and the reaction time was 1 hour, and 12.5 parts of 4-tolyl-thio-2,6-di-t-butylphenol was obtained. Yield: 76 percent.

We claim:

1. A process for preparing a 4-arylthio-2,6-dialkylphenol having the general formula

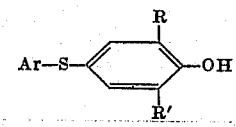

wherein Ar is an aromatic radical, R and R' are respectively $C_1$–$C_4$ alkyl groups, characterized by reacting an aromatic disulfide selected from the group consisting of bis(4-methoxyphenyl) disulfide, diphenyl disulfide, di(p-tolyl) disulfide, bis(p-chlorophenyl) disulfide, bis(p-bromophenyl) disulfide and 4,4'dithiobis (2,6-di-t-butylphenol) with a 2,6-dialkylphenol under heating in a solvent in the presence of a basic material.

2. A process for preparing 4-arylthio-2,6-dialkylphenol according to claim 1, wherein said solvent is selected from the group consisting of an alcohol, pyridine, dimethyl formamide and dimethyl acetamide.

3. A process for preparing 4-arylthio-2,6-dialkylphenol according to claim 1, wherein said basic material is selected from the group consisting of an alkali hydroxide and alkali metal.

4. A process for preparing 4-arylthio-2,6-di-t-butylphenol according to claim 1, wherein said 2,6-dialkylphenol is 2,6-di-t-butylphenol.

5. A process for preparing 4-arylthio-2-t-butyl-6-methylphenol according to claim 1, wherein said 2,6-dialkylphenol is 2-t-butyl-6-methylphenol.

* * * * *